United States Patent Office 3,781,253
Patented Dec. 25, 1973

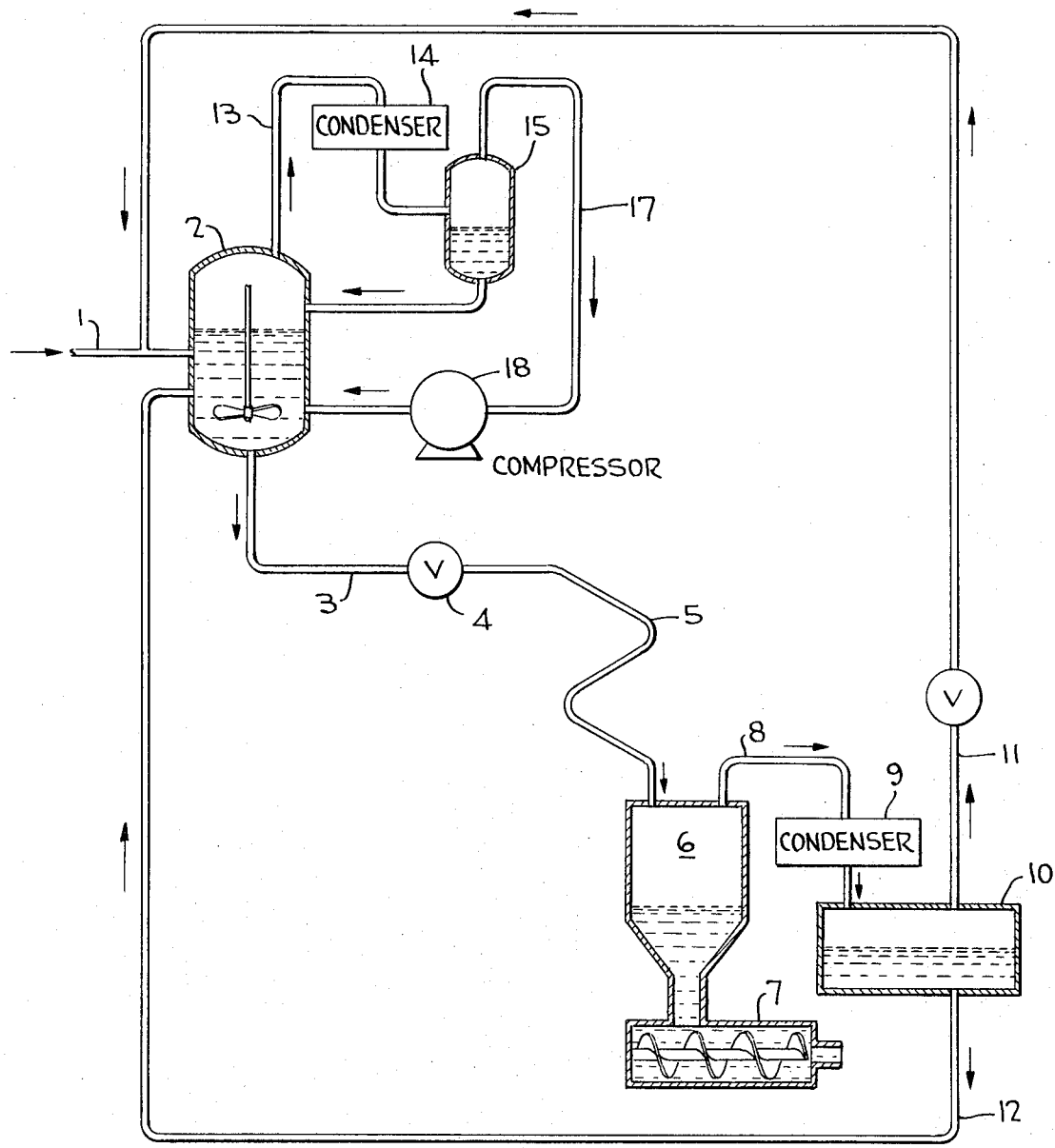

3,781,253
PROCESS FOR THE PREPARATION OF ETHYLENE POLYMER OR COPOLYMER
Akikazu Mori, Otake, Hideo Nara, Iwakkuni, Toshiki Kataoka, Waki-Mura, Norio Kashiwa and Tadaichi Tokuzumi, Otake, and Yutaka Horota and Hiroshi Fujimura, Iwakuni, Japan, assignors to Mitsui Petrochemical Industries, Ltd., Tokyo, Japan
Continuation of abandoned application Ser. No. 881,718, Dec. 3, 1969. This application May 15, 1972, Ser. No. 253,654
Claims priority, application Japan, Dec. 3, 1968, 43/88,081
Int. Cl. C08f 1/42, 3/06, 15/04
U.S. Cl. 260—85.3 R
4 Claims

ABSTRACT OF THE DISCLOSURE

A process for the preparation of polyethylene which comprises polymerizing ethylene in solution phase (the solution phase excludes a polymer or copolymer existing in solid phase, but included such polymer in molten state), in a polymerization solvent of linear or cyclic pentane, hexane, or heptane in the presence of a carrier-supporting Ziegler catalyst, while maintaining the polymer concentration in the polymerization system at not higher than 20% by weight and controlling the polymerization temperature by forcedly circulating an inert gas through the polymerization zone; subjecting the liquid phase reaction product containing the formed ethylene polymer or copolymer in molten state to a lower pressure not higher than the polymerization pressure, which allows vaporization of the solvent in the liquid phase, to evaporate and separate the solvent; and recovering the softened or molten state ethylene polymer or copolymer from which the solvent has been removed.

---

This is a continuation of application Ser. No. 881,718, filed Dec. 3, 1969, now abandoned.

This invention relates to a process for the preparation of an ethylene polymer or copolymer which comprises polymerizing or copolymerizing ethylene in solution phase to form a polymer-containing liquid phase (the solution phase excludes a polymer or copolymer existing in solid phase, but includes such polymer in molten state) in the presence of a reduced amount of catalyst while avoiding reduction in catalytic activity under high temperatures which may be employed for ethylene polymerization, evaporating and separating the solvent at an improved solvent removing efficiency by skillfully utilizing the heat of the liquid polymerization product, and recovering the resulting softened ethylene polymer or copolymer as it is, or further processing it, for example, granulating it into uniform size grains, for example, into pellets, by any conventional shaping means, such as granulating with a pelletizer.

More particularly, the process of the invention comprises polymerizing ethylene in solution phase optionally containing a minor amount of at least one other co-monomer at temperatures ranging from 160° to 300° C., and at pressures ranging from 30 to 200 kg./cm.² (gauge pressure), in a polymerization solvent selected from the group consisting of chain and cyclic pentanes, hexanes and heptanes, in the presence of a carrier-supported Ziegler catalyst formed by mixing (a) A transition metal catalyst component selected from the group consisting of halides of titanium and vanadium which is supported on a carrier selected from, for example, oxides, hydrous oxides, hydroxides, sulfates, carbonates, phosphates, and halides of magnesium and manganese (II), and (b) An organometallic catalyst component selected from the group consisting of organoaluminum compounds and dialkyl zinc, while maintaining the polymer concentration in the polymerization system at not higher than 20% by weight, and controlling the polymerization temperature by circulating an inert gas forcedly through the polymerization zone, (c) subjecting the liquid phase reaction product containing the resulting ethylene polymer or copolymer in molten state to a lower pressure not higher than the polymerization pressure, which allows vaporization of the solvent, to evaporate and separate the solvent from the liquid phase, recycling the solvent's vapor into the polymerization system to control polymerization temperature, and at the same time recovering the softened or molten state ethylene polymer or copolymer from which the solvent has been removed, the particularly advantageous practice being such that the flow of foregoing liquid phase reaction product is led to a polymer-dividing zone which is maintained at said lower pressure not higher than the polymerization pressure to allow vaporization of the polymerization solvent in the liquid phase, and is so constructed as will prevent escape of the solvent vapor from said flow, said polymer-dividing zone serving to transfer the reaction product as well as to finely divide the molten state polymer contained in said liquid phase by the action of turbulent flow caused by the solvent vapor; then the flow containing the finely divided, molten state polymer particles is led continuously to a polymer recovery zone at which the solvent vapor is evaporated, separated and allowed to escape from said flow, and the remaining, finely divided, softened or molten state ethylene polymer or copolymer is either recovered as it is, or subsequently subjected to other shaping means such as granulation to be recovered as a shaped product such as pellets.

Some proposals on the attempt to separate solid polyolefin from polyolefin solution in volatile solvent, or from that obtained through solution polymerization of olefines by utilization of flash evaporation techniques are known (e.q., British Pat. No. 971,420).

One common aspect of the proposals is that the temperature of heated polymer's solvent solution is lowered to the solidifying point of the polymer in the solution or to the point at which the polymer does not solidify but becomes no more flowable, by vaporizing the solvent under abrupt reduction in pressure. That is, the polymer's solvent solution is caused to flow into a sufficiently large space to allow sudden vaporization of the solvent in the solution and escape of the vapor, such as a flash evaporation chamber, to cause instantaneous vaporization of a substantial portion of the solvent, and simultaneously deprive the solution of the latent heat of vaporization so that the polymer therein may be solidified.

However, in accordance with such known practices, the resulting solid polymeric particles, for example, fibrous particles, still contain appreciable amount of the solvent remaining therein, and must be further removed of the solvent, for example, by compression.

As an improvement of those flash evaporation-utilizing methods, it has been proposed to heat a polymer's solvent solution obtained under lower temperature and pressure polymerization such as 50° C. and 6 atmospheres, to such a temperature (200–260° C.) at which the polymer assumes the flowable state easily extrudable at temperature above its melting point under an elevated pressure, and thereafter to lend the heated solution to a flash chamber as above-described to cause flash evaporation of the solvent, said chamber being heated to cause the polymer to be recovered in the flashing zone in liquid state, and the solvent, to be sent to the recovery system from the chamber in super-heated state (French Pat. No. 1,515,825). The last-cited patent also teaches that stripping with superheated steam may be concurrently practiced at said flashing zone, in order to prevent the solvent from remaining in the polymer.

In the above proposal, the flowable polymer from which the solvent has been removed can be directly fed into a shaping machine such as pelletizer by means of an extrusion pump and molded into desired form.

However, the above proposal is accompanied with such defects as that, because the polymerization is performed at relatively low temperatures, a substantial part of the heat of polymerization generated is removed by cooling for the purpose of controlling the polymerization temperature, and therefore cannot be utilized as the energy for flashing; consequently, that the mixture of polymer and solvent as recovered from the polymerization vessel must be further heated to 200–260° C. as mentioned in the above to be supplied with thermal energy before subjection to flashing; that the polymer is thermally deteriorated in the heater; and that, because the polymer formed in the polymerization system is present in solid state, i.e., the reaction product is in the form of polymeric slurry, it is difficult to sufficiently agitate the system or to cause diffusion of monomer (if in gaseous state), markedly large power being required for the stirring.

If the polymerization at the lowest feasible temperature and pressure as above is attempted to be performed to obtain the polymer in the state close to a solution (homogeneous), in order to avoid the foregoing defects, much larger amount of solvent must be used, and accompanying reduction in productivity is unavoidable. Furthermore, presence of a large amount of solvent causes greater reduction in temperature of the polymer solution at the time of flashing. Consequently, instead of the intended flowable polymer, most likely solidified polymer will be obtained. Then it will become necessary to heat the flashing zone allowing the separation and escape of vapor to still higher temperatures, with increased disadvantages to the operation and apparatus.

Furthermore, because the polymer remaining after the vaporization and escape of a substantial part of the solvent is obtained as one block, flowable polymer mass, it is in contact with the flashing space only at the liquid surface thereof, and sufficient further escape of the solvent possibly remaining in the single molten state polymer mass can hardly be expected, while the liquid polymer can be conveniently led directly to an extruder.

Whereas, polymerization processes in which reaction products are not in the state of slurry (containing solid polymer), like in the subject process, are also known. For example, U.S. Pat. No. 2,862,917 discloses a process for polymerizing ethylene at 150°–300° C., and 40–200 atmospheres, according to which polyethylene of improved toughness is obtained, but the amount of catalyst required is not reduced, probably because the ordinary, unsupported Ziegler catalyst exhibits only low activity at such high temperatures.

Also an attempt to reduce the amount of catalyst required for ethylene polymerization by employing high pressures such as at least 500 atmospheres and temperatures of 175°–300° C. for the reaction is known from U.S. Pat. No. 2,882,264. The gist of the process resides in the adoption of extremely high reaction pressures such as at least 500 atmospheres, preferably 1,000–2,000 atmospheres, in order to supplement the reduced catalytic activity at high temperatures, and at the same time to reduce the amount of catalyst. The commercial availability of this process is not altogether high, because the advantage of less use of catalyst is more than off-set by the disadvantages caused by the use of such high pressures, for example, enormous equipment cost.

We have engaged in laborious studies in the purpose of eliminating the foregoing deficiencies in heretofore proposed high temperature and high pressure reactions as well as the defects in flashing separation of polymerization solvent, and discovered that the purpose can be accomplished by the polymerization under the specified conditions using the carrier-supported Ziegler catalyst and solvent elimination as described initially in this specification. Particularly when the liquid phase polymerization product containing ethylene polymer or copolymer in molten state is subjected to a pressure which is lower than the polymerization pressure to allow vaporization of the solvent in the reaction liquid, and whereby separated solvent vapor is recycled into the polymerization system to control the polymerization temperature, the foregoing defects can be all concurrently solved. Furthermore, according to the most preferred practice, a unique procedure of finely dividing molten state polymer is given to the liquid phase reaction product while preventing the escape of solvent vapor from the flow of reaction product, the procedure being quite different from the conventional flash separation in technical concept, and thereafter the flow containing finely divided polymer particles is subjected to the aforesaid lower pressure to cause the separation of solvent from polymer resembling a mere gas-liquid natural separation rather than "flashing" of conventional sense, thus separated solvent vapor being similarly recycled into the polymerization system. Thus the reduction in catalytic activity under high temperature polymerization can be avoided, and the polymerization can be satisfactorily performed with reduced amount of catalyst. In addition the disadvantageous consumption of thermal energy unavoidable in the prior art can be eliminated and the solvent can be removed at improved efficiency.

The cause of this improved solvent removal efficiency is not entirely clear, but presumably one of the causes is that the polymer-containing reaction mixture in accordance with this invention is contacted with the high speed solvent vapor flow which assists the evaporation and separation of solvent contained in the polymer in the polymer-dividing zone through the unique step (c), and is obtained as an agglomerate of finely divided, softened ethylene polymer or copolymer particles not entirely void of flowability, or as a continuous melt phase, at the polymer recovering zone, thus maintaining the contact with the space of polymer recovery zone allowing further separation and escape of the solvent at each particle surface, while retaining the state as can be readily supplied to processing means such as an extruder.

Accordingly, the object of the present invention is to provide a process for obtaining ethylene polymer or copolymer in the form of softened particles, or continuous melt, or as shaped products such as pellets, film, sheet, pipe, etc., through optional additional shaping means, by an integrated series of operations, from ethylene polymerization reaction system, at improved solvent removal efficiency and with conspicuous operational and equipmental advantages, from which the drawbacks in the prior arts as above-described are skillfully eliminated.

Still many other objects and advantages of the invention will become apparent from the following descriptions.

According to the subject process, the transition metal halogen compound catalyst component bound onto a carrier as specified in (a) is mixed with an organometallic compound catalyst component specified in (b), and the resulting carrier-supported Ziegler catalyst is used in the solution polymerization or copolymerization of ethylene (polymerization in solution phase defined hereinbefore) at the temperatures ranging from 160°–300° C., preferably 200–250° C., in a polymerization solvent, under a polymerization pressure within the range of 30–200 kg./cm.$^2$ (gauge pressure), preferably 40–100 kg./cm.$^2$ (gauge) which is sufficiently high to maintain the solvent at liquid state. The polymerization is performed while maintaining the concentration of the polymer present in the system as dissolved in the solvent or itself melted, at not higher than 20% by weight.

Thus, a liquid phase polymerization product (not in slurry form) containing molten state ethylene polymer or copolymer is obtained, which is a liquid of considerably high viscosity containing a part of the formed polymer in molten state and the remaining part of the polymer as dissolved in the solvent. In the present specification, thus the slurry form product is excluded from the scope of the term, "polymerization product containing ethylene polymer or copolymer in molten state."

By the use of the above carrier-supported Ziegler catalyst, reduction in catalytic activity in high temperature polymerization and consequent increase in the amount of catalyst can be avoided without employing extremely high pressure, but the high temperature polymerization can be performed in the presence of a reduced amount of catalyst which dispenses with the necessity of catalyst removal after polymerization, while maintaining sufficiently high catalytic activity level. Thus, because the polymerization is performed at much higher temperatures than those employed in the aforementioned proposal on improvement of flash evaporation system, the heat generated during the polymerization reaction can be advantageously utilized to maintain the reaction product containing ethylene polymer or copolymer in molten state at liquid phase. In contrast to said known flash system, therefore, it is unnecessary in the subject process to further heat the reaction product withdrawn from the polymerization system before flashing, to maintain the product in molten state also after the flashing. This makes the subject process definitely superior to the known process in respect of operational simplicity as well as thermal balance.

Normally a large amount of heat is generated during olefin polymerization, for example, approximately 800 kcal./kg. (polymer) in case of homopolymerization of ethylene. Conventionally the heat of polymerization has been removed to the maximum possible extent by cooling, because in most cases the polymerization temperatures are kept down to such lower level as not higher than 100° C. Whereas, we solved the various problems inherent in high temperature polymerization and made such practice quite feasible, using the greatest part of the heat of polymerization for maintaining the controlled temperature of the polymerization system. Consequently, the solution containing the molten state polymeric product as withdrawn from the polymerization system can be used in the subsequent step without any heating.

In accordance with the present invention, the controlling of polymerization temperature is effected normally by forced circulation of an inert gas through the polymerization zone, and the heat of polymerization of ethylene can be removed by cooling the solvent forcedly vaporized by the inert gas and recycling the liquefied solvent into the polymerization vessel. That is, the temperature within the polymerization vessel is controlled utilizing heat of evaporation of the solvent. By varying the amount of inert gas forcedly circulated through the system, the vaporized amount of solvent can be optionally controlled to regulate the polymerization temperature.

As the inert gas, normally those which do not inactivate catalyst, such as nitrogen, hydrogen, etc., are used, while unreacted ethylene gas, and occasionally other copolymerizable olefin gas, are apt to get mixed into the circulating gas. Particularly the use of hydrogen is preferred because whereby the molecular weight-controlling effect can be simultaneously expected.

As the result of adopting the gas circulation system as the means of polymerization temperature control, the gas blown into the polymer solution (polymer-containing liquid phase) from the bottom of polymerization vessel is dispersed and rises through the solution while stirring the latter. However, in order for the gas to be dispersed as uniform, fine bubbles, the polymer solution must have a viscosity not higher than 1,000–2,000 cp., i.e., the polymer concentration in the solution should normally be not higher than 20% by weight. At the viscosities higher than the above upper limit, not only insufficient stirring effect comes to be observed but also the gas tends to channel through the polymer solution. From this aspect also the polymer concentration present in the polymerization system must be subject to a certain limitation.

Accordingly, amount of ethylene supply is controlled, taking suitably into consideration the amount of catalyst used, residence time, polymerization temperature and pressure, etc., so as to maintain the polyethylene concentration in the polymerization vessel at not higher than 20 wt. percent.

The temperature controlling by forced circulation of inert gas also facilitates the removal of heat of polymerization. Consequently, it enables the high temperature polymerization under accelerated polymerization rate, so that the material ethylene supply can be greatly increased in comparison with conventional practice.

As the carrier to support the transition metal catalyst component specified in (a), any member of the group, for example, of oxides, hydrous oxides, hydroxides, carbonates, phosphates and halides of magnesium or manganese-(II) can be used. As specific examples of such carrier, for example, magnesium oxide, hydroxide, and basic carbonate, manganese-(II) hydroxide, magnesium phosphate, chloride, bromide, iodide, and oxychloride, and manganese-(III) chloride, may be named.

Preferred carriers include oxides, halogen compounds, hydroxides, carbonates, basic carbonates and phosphates of said metals, inter alia, magnesium oxide, hydroxide, chloride, oxychloride, carbonate, basic carbonate, and phosphate, and manganese dichloride and dihydroxide.

As the halogen compounds of titanium and vanadium to be bound onto those carriers, those which are liquid or vapor phase under the conditions of supporting treatment are used. More specifically, tetravalent titanium halogen compounds such as titanium tetrachloride, tetrabromide, ethoxytrichloride, diethoxydichloride, and dibutoxydichloride; tetravalent vanadium halogen compounds such as vanadium tetrachloride; and pentavalent vanadium halogen compounds such as vanadium oxytrichloride; may be illustrated, tetravalent titanium halide, inter alia, titanium tetrachloride, being particularly preferred.

In order to bind such a titanium or vanadium halide onto a carrier, any of the treatments effective for intimately contacting the solid carrier compound with the halogen compound which is in liquid or gaseous state under the treating conditions, such as immersion of the carrier in liquid halide, immersion of the carrier in solution of titanium halogen compound, passing of titanium halogen compound vapor through carrier layers, etc., can be used. In a preferred practice, the solid carrier particles are heated together with the transition metal halogen compound which is liquid under the treating conditions, normally at from room temperature to 300° C., preferably 30–200° C., most preferably 40–150° C., for 10 minutes to 5 hours. For obvious reasons, the treatment is performed in the absence of oxygen and water, preferably in an atmosphere of inert gas. After being contacted with the transition metal halogen compound for the desired time at desired temperature, the carrier is separated from the unreacted transition metal halogen compound by filtration or decantation, preferably washed with fresh transition metal halogen compound, and washed normally with a suitable inert solvent such as hexane, heptane, kerosene, etc., so as to be removed of the free, unsupported transition metal halogen compound as thoroughly as possible.

The transition metal halogen compound thus bound onto a carrier is either formed into a suspension in an inert solvent, or into solid powder from which the washing has been volatilized in a dry, inert gaseous current or under reduced pressure conditions, and used as one of the polymerization catalyst component.

It is permissible to pre-heat the carrier in advance of the above supporting treatment, for example, to 100–350° C., or to subject the carrier to a thermal pre-treatment under reduced pressure.

As the organometallic catalyst component, any of organoaluminum compound normally used as Ziegler catalyst component may be used, but those which decompose at such a higher polymerization temperature employed in the subject process are not preferred. As other organometallic catalyst components, dialkyl zinc such as dimethyl zinc, diethyl zinc, etc. can be employed.

Examples of preferred organoaluminum compounds include triethylaluminum, tributylaluminum, diethylaluminum chloride, diisobutylaluminum chloride, ethylaluminum sesquichloride, etc.

In the present invention, the ethylene polymer in the liquid reaction product is in molten state in the polymerization system, and a portion thereof is presumably dissolved in the polymerization solvent.

The subject process can also be advantageously applied to reaction product containing ethylene homopolymer, or copolymer of ethylene with a minor amount of at least one other copolymerizable comonomer selected from the group, for example, of propylene, butene, styrene, and butadiene. The "minor" amount preferably signifies the comonomer content of not more than 20% by weight in the copolymer.

Obviously, the polymerization solvent should be inert to the carrier-supported Ziegler catalyst employed. As such solvent, chain or cyclic saturated hydrocarbons of 5–7 carbons can be used, the use of such hydrocarbons of 6 and/or 7 carbon atoms, i.e., hexane, cyclohexane and/or heptanes fraction being particularly preferred from the standpoint of easy recovery of polymerization solvent and thermal economy. Saturated hydrocarbons containing excessively many carbons requires much heat of volatilization after their use as the polymerization solvent. Therefore their use is disadvantageous, although not impossible. Conversely, saturated hydrocarbons of too few carbon atoms are not only difficult for recovery, but also the temperature may reach above the critical point of the solvent in the polymerization, and therefore are unsuitable.

According to the process of the invention the operation of step (c) is preferably performed by unique combination procedures of markedly different technical concept from that of conventionally practical flashing means for solvent removal.

That is, the liquid reaction product containing ethylene polymer or copolymer of such high temperatures as at lowest 160° C. in molten state in the polymerization solvent (as aforesaid, a portion of the polymeric product is presumably dissolved in the solvent), is led to a polymer-dividing zone which satisfies the following conditions (i) and (ii), and function to transfer the flow of said liquid reaction product as well as to finely divide the molten polymer in said flow:

(i) that the pressure of the zone is controlled at a lower level not higher than the polymerization pressure to allow vaporization of the polymerization solvent in the liquid reaction product containing the ethylene homopolymer or copolymer in molten state, and (ii) that the zone is so constructed as to prevent the solvent vapor formed of the flow of liquid polymerization product from escaping out of said flow.

Such a zone can be easily formed by the provision of a reducing valve at a suitable location of the transferring path, for example, a pipe, and by allocating a sufficiently long distance from the location of the reducing valve to the polymer recovery zone at which the polymerization solvent is separated in vapor from the flow of reaction product and allowed to escape from acid flow.

The flow of reaction product containing ethylene polymer or copolymer in molten state is set under such lower pressure level as to allow vaporization of the solvent in this zone, and thus formed or being formed solvent vapor travels with the flow of polymerization product moving at a considerably high rate, forming a turbulent flow as seen in an outlet pipe of paint spray-gun. The ethylene polymer or copolymer in the flow of reaction product still remaining substantially in the molten state is finely divided by the violent action of said turbulent flow, so that the evaporation of solvent contained in the polymer or copolymer is promoted.

The above step is quite different from conventional flashing operation which is practised in a flashing chamber allowing free escape of the solvent vapor from the flow of heated solvent solution of polymer. That is, the substantially, transient phenomenon occurring in the vicinity of entrance to the flashing chamber in the conventional flashing is realized as one, substantial step with definite advantage.

Thus in the preferred embodiment of the subject process, a flow of polymerization product containing finely divided, molten polymer particles and superheated solvent vapor is formed before the flow of polymerization product reaches the polymer recovery zone at which the solvent vapor can freely escape continuously as separated from said flow. The flow of polymerization product is then led to the polymer recovery zone.

This polymer recovery zone possesses the space which allows ready escape of the solvent vapor from the polymerization product similarly to the flashing chamber in conventional practice. Whereas, since a considerable amount of vapor solvent has already been separated from the polymer and the polymer is finely divided while substantially retaining its molten state in accordance with the invention, as a whole the flow of reaction product is led to the polymer recovery zone in substantially gaseous form, and such instantaneous, violent flashing phenomenon as seen in conventional process does not take place at the vicinity of entrance to said zone. Consequently, the polymer does not take the form of fibrous textured polymer particles, and therefore, needs not be removed of residual solvent by mechanical compression after recovery. Furthermore, the flow of polymerization product retains its high temperature throughout the operation, and the violent temperature drop accompanying with the abrupt evaporation and escape of the solvent from each flashing liquid drop which occurs in the flashing chamber of conventional method is conspicuously moderated, although it is true that minor temperature reduction is observed during the polymer-dividing step. Consequently, in the polymer recovery zone of the invention, a phenomenon rather resembling natural separation of vapor phase initially contained in liquid state from solid liquid phase, than the "flashing phenomenon" in normal sense, takes place, although considerably slight extent of flashing phenomenon may incidentally occur. Thus, it is unnecessary to add such a heating procedure of poor thermal efficiency as substantially heating the flashing zone of low heat conductivity to maintain the recovered polymer at a continuous flowable mass of one block, as required in the already mentioned prior French patent.

Thus the ethylene polymer or copolymer can be readily recovered as an agglomerate of finely divided softened polymer particles still retaining some flowability or continuous melt phase, which may be directly recovered, or further subjected to a processing means such as extrusion.

The reason is not clear why the polymer according to this invention is highly free from solvent. Presumably, because the product passes through the particulate state, i.e., the state having very much broadened surface area while maintaining, to say the least, softened condition, further escape of solvent in the space of the polymer recovery zone allowing the escape of solvent vapor is promoted.

Accordingly, the combination of above two steps in the preferred embodiment of the subject process is different also from multistage flashing. The uniqueness of the procedure resides in that an instantaneous phenomenon taking place in the conventional flashing operation without substantially exhibiting its potential effect is fixed as a definitely designed step.

According to the subject process, the ethylene polymer or copolymer of at least softened state in the polymer recovery zone can be directly subjected to a processing means such as pelletizer, and formed into shaped products through a series of procedures, such as pellets, film, blow-molded vessels, containers, sheet, pipe, etc.

Now a preferred embodiment of the apparatus suited for practising the subject process will be explained referring to the attached drawing, taking the case of polyethylene.

The drawing shows the flow sheet embodying one apparatus suited for practising the present invention. Referring to the drawing, ethylene, polymerization catalyst, polymerization solvent, and if necessary, comonomer or comonomers such as propylene, butene, etc., and molecular weight-controlling agent such as hydrogen are introduced into the polymerization vessel 2 through the inlet pipe 1.

The inside of the polymerization vessel 2 is controlled at a temperature not lower than 160° C. and a pressure not higher than 200 kg./cm.$^2$ (gauge) at which the solvent employed can be maintained at liquid state. When heptane is selected as the solvent, the polymerization is performed, for example, at 240° C. and 80 kg./cm.$^2$ (gauge). The residence time is preferably selected from within the range of 30 minutes to 3 hours. The flow of polymerization product mixture containing polyethylene withdrawn through pipe 3 from the vessel 2 is imparted with a reduced pressure controlled to be 2 kg./cm.$^2$ (gauge) as it passes through the pressure reducing valve 4, without intervening heating.

The flow of polymerization product mixture passes through pipe 5 under reduced pressure, in which forming a turbulent flow accompanying the formed or being formed solvent vapor, and by the action of said turbulent flow, the molten state polyethylene in said flow is finely divided. With the pressure reduction in said zone, temperature reduction also takes place, but not so abruptly as normally observed in conventional free space flashing. In order to avoid excessive inhibition of solvent vapor formation as will interfere with making of turbulent flow in said zone, one or plural heating devices may be provided at the suitable location or locations of pipe 5 (not shown in the drawing) to assist the finely dividing effect of the molten state polymer in the flow of reaction product, as well as to prevent solidification of the polymer, although such is unnecessary if the flow from polymerization vessel 2 has sufficiently high temperature. The temperature of reaction product flow formed in the polymer-dividing zone in the pipe 5 is suitably maintained at approximately 140–220° C., by optionally utilizing the above heating devices, and by controlling the pressure by means of the reducing valve 4.

It is a preferred practice to make the suitable part consisting of curved and straight zone (so-called meandering part) of pipe 5 illustrated in the drawing jacketed, to effect external heating or to heat said part with other heating devices, for example, electric heater or infrared ray radiator. If desired, a peep-window or windows may be provided on the suitable parts of the pipe 5, so that the pressure control may be effected while observing the state of turbulent flow formed by the solvent vapor as it is prevented from escaping out of the reaction product flow.

The flow rate of the ethylene polymerization reaction product in the tubular passage provided with pipe 5 is variable depending on the diameter, length, etc. of the pipe, while normally that of not less than 30 m./sec. is preferred. For example, the range of 40–80 m./sec. is favorably used. In the drawing, the polymer-dividing zone is illustrated as formed mostly of curved and straight (so-called meandering) pipe 5, but it will be readily understood that design changes such as making it coil-like, etc., are perfectly permissible.

The flow of reaction product passed through the polymer-dividing zone (polymer-minimizing and transferring zone) is then led to the polymer recovery zone 6 in which the vapor of polymerization solvent which have been prevented from escaping out of the flow up to that time can freely escape.

Said zone 6 is preferably forming a hopper of an extruder 7, so that it can be connected to an extruder 7, for example, a pelletizer.

If necessary, a vent-type extruder may be used, to effect removal of remaining polymerization solvent and unreacted ethylene from the softened state polyethylene. It is also possible to perform supply and blending of a stabilizer or additives in this zone. The polymerization solvent vapor, the unreacted monomer and inert gas if any are led to condenser 9 through pipe 8, to be cooled and condensed, and further sent to the gas-liquid separator 10. Thus, through pipe 11 unreacted ethylene, in certain cases copolymerizing component, molecular-controlling agent, etc. are recovered in gaseous form, and through pipe 12 the polymerization solvent is recovered in liquid form. Since the polymerization solvent and unreacted ethylene recovered from hopper 6 never encounter such a component as will inactivate the catalyst, they can be directly recycled into the polymerization vessel without purification.

Most of the heat of polymerization is consumed for elevating the temperature of the solvent which is recovered after evaporation (for example, n-heptane) to the polymerization temperature, but in majority of cases a part of the heat of polymerization must be removed by another cooling means. For this purpose, we adopted the cooling system by forced circulation of gaseous mixture comprising inert gas, monomer, solvent vapor, etc., through the polymerization vessel 2.

That is, the gaseous mixture mentioned above in the upper part of the polymerization vessel 2 is led to condenser 14 through pipe 13, and cooled to approximately 80° C., whereby condensing the solvent vapor (n-heptane). The solvent is separated from the uncondensed gas at the separator 15, and recycled into the polymerization vessel 2. The uncondensed gas is given an elevated pressure at the compressor 18 as fed into the latter through pipe 17, and blown into the vessel 2 from the vicinity of bottom thereof, at the elevated pressure.

Said gas promotes the evaporation of solvent in the vessel 2, to cool the polymerization system by converting heat of polymerization to that of evaporation.

Most notable feature of such cooling system resides in that the amount of heat deprived from the polymerization system can be arbitrarily controlled by regulating the rate of the gas blown into the system.

Thus, as an assembly of devices forming an apparatus suited for practising the subject process, that comprising a polymerization vessel in which liquid reaction product containing ethylene polymer or copolymer in molten state is formed; passage of the liquid reaction product passing first through non-heated pipe which leads, through a pressure reducing valve, to a polymer-dividing zone serving to transfer the flow of reaction product as well as to finely divide the polymer in said flow, such as, for example, meandering or coiled pipe; inert gas circulating system starting from the upper space of the polymerization vessel and including a condenser, solvent separator, and compressor, whereby blowing the inert gas separated from the solvent-containing vapor into the polymerization vessel from the bottom thereof; solvent circulating system to circulate recovered solvent from the solvent separator into the polymerization vessel; polymer recovery vessel optionally forming a hopper of an extruder into which the end of aforesaid passage opens; another passage to lead the evaporated and gaseous phase into a gas-liquid separator for recovering the vaporized polymerization solvent from the polymer recovery vessel, through a condenser; and an extruder connected to aforesaid hopper, is provided.

According to the subject process, ethylene can be polymerized at higher temperature and pressure in the presence of afore-specified catalyst, to widely varied range of average molecular weights, ranging as low as from several thousand to as high as a hundred and tens of thousand. In the conventional practice, it is necessary to externally increase the amounts of hydrogen and catalyst in order to obtain low molecular weight polyethylene. Quite in contrast, because the polymerization in accordance with the subject process is effected at higher temperature and pressure, those additives work with high efficiency, and their amounts can be reduced without any detrimental effect. Also because the density of polyethylene can be widely varied depending on the using conditions of catalyst when the catalyst is composed of transition metal compound and organometallic compound, products, resembling so-called high pressure process polyethylene having the densities ranging from 0.92 to 0.97 can be formed by the subject process. Low density polyethylene conventionally prepared at low pressure (normal pressure) polymerization is difficult to be separated from the polymerization solvent by means of a filtering machine as normally practised, because the partially oily and fatty polyethylene clogs the filter meshes. Whereas, according to the present invention also such oily and fatty polyethylene is effectively separated from polymerization solvent, without the filtering step.

It is preferred to supply propylene together with ethylene to the polymerization system, in order to prepare low density polyethylene according to the subject process. In the conventional practice, the polymerization product containing more than 3% of copolymerized propylene is difficult to be treated, in the steps such as separation from solvent. Whereas, because the difficulty in separation from solvent is solved according to the subject process, it is made possible to copolymerize as much as 10 to 15% of propylene with ethylene, to produce such low density ethylene copolymer as of approximately 0.92.

Thus obtained low density polyethylene not only has the density of approximately the same level to that of ordinary low density polyethylene or high pressure process polyethylene, but also is rich in pliability, while still exhibiting the semitransparency of film, characteristic of high density polyethylene. It is very useful as delustered film.

It is also easy to make low molecular weight polyethylene, for example, those of molecular weights ranging from 1,000 to 2,000, by the subject process. Such is accomplished by employing higher partial pressure of hydrogen and increased catalyst concentration in the polymerization system. Because conventional low molecular weight polyethylene is difficult to be separated from polymerization solvent, heretofore no product prepared with the use of Ziegler type polymerization catalyst is known. This drawback is completely eliminated from the subject process, wherein the solvent is separated from polymer as vaporized.

It has been necessary to extremely increase the amounts of hydrogen and catalyst used in the conventional polymerization process, in order to depress the molecular weight of polyethylene. However, required amounts of hydrogen and catalyst for the same purpose are much less for the subject process, because the ethylene polymerization in accordance with the invention is performed at higher temperature and pressure, and consequently the hydrogen and catalyst act very effectively.

As so far described, the catalyst concentration can be set at lower level in practising the subject process, and therefore catalyst removing step normally required in conventional polyethylene preparation is unnecessary. However, if complete removal of catalyst is required for the polyethylene to special usage, etc., it is permissible to subject the product to known catalyst removing step, or treat the same with catalyst inactivating agents, for example, in the hopper or in the extruder.

Hereinafter several embodiments for practicing the present invention will be explained by way of examples.

EXAMPLE 1

To 20 g. of commercially available magnesium hydroxide dried at 80° C. for 12 hours in a vacuum drier, was added titanium tetrachloride in an amount (80 cc.) sufficient to dip the magnesium hydroxide, and then the mixture was heated at 140° C. while stirring. After this state had been maintained for 90 minutes, the system was cooled and the solid portion was separated. The solid was washed sufficiently with purified hexane until no chlorine was detected in the washing liquor, followed by drying under a dried nitrogen stream. As a result of the quantitative analysis of the solid it was found that titanium chloride equivalent to 15 mg. of titanium and 80 mg. of chlorine per gram of the carrier was fixed to the solid.

Into a stainless-steel 200-liter capacity polymerization vessel equipped with a stirrer, the so-formed carrier-supported catalyst component and triethylaluminum were continuously charged at rates of 5 g./hr. and 20 mmol/hr., respectively. To this polymerization vessel hexane was also fed continuously at a rate of 70 liters/hr. and ethylene was fed thereinto in an amount sufficient to maintain the inside pressure of the polymerization vessel at 80 kg./cm.$^2$ gauge (at a rate of about 18 kg./hr.). Thus, the polymerization was conducted at 220° C. Into the polymerization vessel hydrogen as the molecular weight adjusting agent was continuously fed in a manner such that the molar ratio of hydrogen to ethylene based on the partial pressures in the gas phase would be kept to be 2%. In order to maintain the inside temperature of the polymerization vessel at 220° C., the gas of the gas phase was discharged at a rate of 300 liters/hr. and cooled to 60° C., and the resulting condensed liquor and noncondensed gas were blown into the bottom of the polymerization vessel and recycled. The polyethylene solution was withdrawn from the polymerization vessel so as to adjust the residence time in the vessel to be 1 hour and separated from solvent under atmospheric pressure to separate hexane therefrom, and the remaining polyethylene was dried. As a result, a polyethylene having an average molecular weight of 39,000, a melt index of 5.4 and a density of 0.968 and containing less than 1 methyl group per 1,000 carbon atoms determined by the infrared analysis was obtained at a yield of 10 kg./hr.

EXAMPLE 2

To the polymerization vessel described in Example 1, there were fed continuously hexane at 70 liter/hr., the carrier-supported titanium halide described in Example 1 at 3 g./hr., triethylaluminum at 20 mmol, ethylene at 11.3 kg./hr. and propylene at 7.3 kg./hr. Further, hydrogen was fed so as to adjust the mol ratio of hydrogen to ethylene and propylene based on the partial pressures in the gas phase to 1%. The polymerization was conducted at 200° C. under 80 kg./cm.$^2$. The hexane solution was withdrawn in a manner such that an average residence time would be 1 hour and the polymer was separated at a yield of 5.8 kg./hr., which was characterized by an average molecular weight of 55,000, a melt index of 0.69 and a density of 0.926 and contained 29 methyl groups per 1,000 carbon atoms measured by the infrared analysis.

EXAMPLE 3

To the polymerization vessel described in Example 1 there were continuously fed hexane at 70 liter/hr., the carrier-supported titanium halide described in Example 1 at 10 g./hr., and triethylaluminum at 20 mmol/hr. While ethylene was continuously fed at 15 kg./hr. to the polymerization vessel, hydrogen was also fed thereto under pressure in a manner such that the inside pressure of the polymerization vessel would be at 50 kg./cm.$^2$, at this time the molar ratio of hydrogen to ethylene in the gas phase was 70%. In order to maintain the inside temperature of the polymerization vessel at 200° C., the gas was discharged at a rate of 600 liters/hr. and cooled to 60° C. The resulting gas and condensed liquor were recycled to the bottom of the polymerization vessel.

A low molecular weight polyethylene was obtained at a yield of 11 kg./hr. from the polyethylene hexane solution coming out of the polymerization vessel by separating hexane therefrom by evaporation. The resulting polyethylene was characterized by an average molecular weight of 2,500 and a density of 0.977 and contained 8-methyl groups per 1,000 carbon atoms measured by the infrared analysis.

EXAMPLE 4

A commercially available magnesium oxide carrier was suspended in titanium tetrachloride, and the suspension was agitated at 125° C. for 1.5 hours. After completion of the reaction the filtration was conducted while the suspension was still hot, and the resulting solid was washed with purified hexane until no chlorine was detected in the washing liquor, followed by drying. (All of the above procedures were conducted under dry nitrogen atmosphere.) The so-prepared carrier-supported catalyst component contained the titanium chloride in an amount corresponding to 12 mg. of titanium per gram of the carrier.

To an autoclave were continuously fed the above carrier-supported catalyst component at a rate of 3.3 mmol/hr. calculated based on titanium, triethylaluminum at a rate of 20 mmole and hexane as the polymerization solvent at a rate of 100 liter/hr. Ethylene and hydrogen were fed to the polymerization vessel at rates of 22 kg./hr. and 0.04 kg./hr., respectively, and the polymerization was conducted under conditions of a polymerization temperature of 210° C., a pressure of 80 kg./cm.$^2$ (gauge) and a residence time of 1 hour. The polyethylene-containing liquid phase withdrawn from the polymerization vessel was passed through a pressure-lowering release valve and introduced into a tubular polymer minimizing zone of 10 mm. in diameter equipped with three jacket-type heaters. At the time, the pressure was down to 5 kg./cm.$^2$ (gauge). The polymer flow which had passed through the polymer minimizing zone was then discharged into a hopper which was a polymer recovery zone. The polyethylene was stored in the molten state at the lower portion of the hopper. The temperature of the polyethylene was 210° C. The polymer was shaped into pellets by means of an extruder connected with the lower portion of the hopper. The temperature in the extruder was 210° C. at a polyethylene inlet, 220° C. at a central portion and 230° C. at an outlet (die portion). The granulated polyethylene was obtained at a yield of 16 kg./hr., and it was characterized by a molecular weight of 39,000, a melt index of 5.4 and a specific gravity of 0.968 and contained less than one branched methyl group per 1,000 carbon atoms.

The total heat of the polymerization generated during the above polymerization was calculated to be 12,800 kcal./hr., and the heat removed from the system by recycling the solvent vapor and/or the inert gas so as to adjust the polymerization temperature at 210° C. was calculated from the recycled amount of the solvent vapor and/or the inert gas to correspond to only 16% of the heat to be removed from the system when the polymerization was conducted in the same manner as above except changing the polymerization temperature to 80° C., which temperature is generally adopted in the conventional slurry polymerization process.

COMPARATIVE EXAMPLE 1

Example 4 was repeated by using as the catalyst 40 mmol/hr. of triethylaluminum and 10 mmol/hr., calculated as titanium, of a hydrocarbon-insoluble, a low-valent titanium halide obtained by reducing titanium tetrachloride with ethylaluminum sesquichloride in kerosene, instead of the carrier-supported catalyst component. As a result, a polyethylene was obtained at a yield of 14 kg./hr. and after pelletization it had a molecular weight of 480,000, a melt index of 3 and a specific gravity of 0.968, and contained less than one branched methyl group per 1000 carbon atoms. Since the polymer was obtained by the polymerization giving a low yield per unit weight of titanium, the color tone of the polymer was extremely inferior and it had hardly any commercial availability as it was.

COMPARATIVE EXAMPLE 2

The polymerization was conducted in the same manner as in Example 4 except changing the polymerization temperature to 150° C., and the withdrawn polyethylene-containing liquid phase was directly introduced into the polymer minimizing zone without being pre-heated (as not in the present process). As a result, the temperature was lowered because of evaporation of the solvent and the polymer became viscous and was clogged in the polymer minimizing zone, with the consequence that the continuous operation was made impossible.

We claim:
1. A process for the preparation of an ethylene homopolymer or copolymer which comprises polymerizing ethylene optionally containing a minor amount of one or more comonomers copolymerizable with ethylene, in a polymerization solvent selected from the group consisting of chain and cyclic pentanes, hexanes, and heptanes, in the presence of a carrier-supported Ziegler catalyst formed by mixing

(a) a transition metal catalyst component selected from the group consisting of halogen compounds of titanium and vanadium bound onto a magnesium compound carrier, and
(b) an organometallic catalyst component selected from the group consisting of organoaluminum compounds and dialkyl zinc, the polymerization being carried out in the solution phase at a temperature ranging from 160° to 300° C., and at a pressure ranging from 30 to 200 kg./cm.$^2$ (gauge), while maintaining the homopolymer or copolymer concentration in the polymerization system up to 20% by weight and controlling the polymerization temperature by forcedly circulating an inert gas through the polymerization zone; leading the liquid phase reaction product containing the formed ethylene homopolymer or copolymer in the molten state to a polymer dividing zone maintained at a lower pressure up to the polymerization pressure, thereby allowing vaporization and separation of the solvent; said polymer dividing zone being so constructed as to prevent escape of the solvent vapor from the flow of the polymerization product mixture, said zone serving to transfer the flow of polymerization product mixture as well as to finely divide the molten state polymer in the flow, and in said zone the molten state polymer being finely divided by the action of turbulent flow caused by the solvent vapor formed in said zone; and leading the flow containing the finely divided polymer particles to a polymer recovery zone wherein the solvent vapor is allowed to escape from said flow causing turbulent flow; directly subjecting the obtained softened or molten state ethylene homopolymer or copolymer to shaping and recovering the shaped product; and recovering the softened or molten state ethylene homopolymer or copolymer from which the solvent has been removed.

2. The process of claim 1 wherein the catalyst component selected from the group consisting of halogen compounds of titanium and vanadium is a member of the group consisting of titanium tetrachloride, tetrabromide, ethoxytrichloride, diethoxydichloride, and dibutoxydichloride, and vanadium tetrachloride and oxytrichloride.

3. The process of claim 1 wherein the organometallic catalyst component is a member of the group consisting of triethylaluminum, tributylaluminum, diethylaluminum chloride, diisobutylaluminum chloride, ethylaluminum sesquichloride, dimethyl zinc and diethyl zinc.

4. The process of claim 1 wherein the comonomer is a member of the group consisting of propylene, butene, styrene and butadiene.

References Cited
UNITED STATES PATENTS

| | | | |
|---|---|---|---|
| 3,454,547 | 7/1969 | Delbouille et al. | 260—94.9 DA |
| 3,506,633 | 4/1970 | Matsuura et al. | 269—94.9 DA |
| 3,506,640 | 4/1970 | Reid et al. | 23—253 R |

JOSEPH L. SCHOFER, Primary Examiner

A. HOLLER, Assistant Examiner

U.S. Cl. X.R.

260—88.2 C, 88.2 R, 94.9 DA, 94.9 F, 94.9 P